(12) United States Patent
Kendrick et al.

(10) Patent No.: US 11,850,733 B2
(45) Date of Patent: *Dec. 26, 2023

(54) ROBOTIC TOOL CHANGER COUPLING MECHANISM WITH INCREASED TORSIONAL RIGIDITY AND REDUCED FREEPLAY

(71) Applicant: ATI Industrial Automation, Inc., Apex, NC (US)

(72) Inventors: Baron Kendrick, Apex, NC (US); Daniel Allen Norton, Apex, NC (US); Dustin Christopher Simons, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/899,033

(22) Filed: Jun. 11, 2020

(65) Prior Publication Data

US 2021/0387357 A1    Dec. 16, 2021

(51) Int. Cl.
*B25J 15/04* (2006.01)
*F16B 21/16* (2006.01)
*B25J 15/00* (2006.01)

(52) U.S. Cl.
CPC ....... *B25J 15/0061* (2013.01); *B25J 15/0416* (2013.01); *F16B 21/165* (2013.01)

(58) Field of Classification Search
CPC . F16B 21/165; Y10T 403/492; B25J 15/0416; B25J 15/0061; B25J 15/0019
See application file for complete search history.

(56) References Cited

U.S. PATENT DOCUMENTS

| 5,211,501 A | 5/1993 | Nakamura et al. |
| 8,005,570 B2 | 8/2011 | Gloden et al. |
| (Continued) |

FOREIGN PATENT DOCUMENTS

| CN | 88101857 A | 10/1988 |
| CN | 101264605 A | 9/2008 |
| (Continued) |

*Primary Examiner* — Christopher J Besler
(74) *Attorney, Agent, or Firm* — COATS & BENNETT, PLLC

(57) ABSTRACT

To substantially eliminate torsional freeplay in a robotic tool changer having a ball-lock coupling mechanism, scallop-like features in the form of cross-contact recesses are formed in at least one of, and preferably both of, a bearing race in a tool assembly at the points of contact of rolling members, and in the opposing inner surfaces of bores containing the rolling members in a master assembly. The cross-contact recesses are sized and shaped to receive a rolling member, but have a central void, or channel, perpendicular to the rolling member's motion in torsional freeplay, which does not contact the rolling member. The cross-contact recess contacts the rolling member at contact areas on either side of the central void. These contact areas impart two separate contact forces on the rolling member, both angled toward the center of the rolling member and hence operative to prevent side-to-side movement, or rocking, of the rolling member within the cross-contact recess, and hence substantially eliminating torsional freeplay of the robotic tool changer.

10 Claims, 9 Drawing Sheets

(56) References Cited

U.S. PATENT DOCUMENTS

| | | |
|---|---|---|
| 8,209,840 B2 | 7/2012 | Norton |
| 8,500,132 B2 | 8/2013 | Norton |
| 8,601,667 B2 | 12/2013 | Norton |
| 8,794,418 B1 * | 8/2014 | Norton ................ B25J 17/0208 |
| | | 901/29 |
| 9,151,343 B2 | 10/2015 | Norton |
| 10,047,908 B1 | 8/2018 | Bohle, II et al. |
| 2005/0238420 A1 | 10/2005 | Hansson |
| 2008/0223169 A1 | 9/2008 | Mizuno |
| 2015/0258647 A1 | 9/2015 | Hediger |
| 2017/0232620 A1 | 8/2017 | Kalb et al. |
| 2019/0255713 A1 | 8/2019 | Churchill |
| 2022/0088798 A1 * | 3/2022 | Norton ................ B25J 15/0416 |

FOREIGN PATENT DOCUMENTS

| | | |
|---|---|---|
| CN | 104908050 A | 9/2015 |
| CN | 105179498 A | 12/2015 |
| CN | 107081781 A | 8/2017 |
| CN | 110709215 A | 1/2020 |
| CN | 111295269 A | 6/2020 |
| DE | 102013208139 A1 | 11/2013 |
| IN | 111300465 A | 6/2020 |
| JP | 4126074 B1 | 7/2008 |
| KR | 20190008902 A | 1/2019 |

* cited by examiner

ROBOTIC TOOL CHANGER COUPLING MECHANISM WITH INCREASED TORSIONAL RIGIDITY AND REDUCED FREEPLAY

FIELD OF INVENTION

The present invention relates generally to robotic tool changers, and in particular to a robotic tool changer having a coupling mechanism that achieves increased torsional rigidity and reduced freeplay.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Furthermore, even in performing one type of task, a robot may utilize different tools. For example, different welding tool geometries may be advantageously mated to a particular robot to perform welding tasks at different locations or in different orientations.

In these applications, a robotic tool changer is used to mate different tools to the robot. One half of the tool changer, called the master assembly, is permanently affixed to a robot arm. The other half, called the tool assembly, is affixed to each tool that the robot may utilize. When a robotic controller aligns the master assembly at the end of a robot arm to a tool assembly attached to the desired tool, it directs the master assembly to mechanically couple to the tool assembly, thus attaching the tool to the robot. Robotic tool changers also facilitate the provision of utilities—such as electrical current, air pressure, hydraulic fluid, cooling water, and the like—to the tool, and the transfer of data from some tools back to a robotic controller.

A ball-lock configuration is commonly deployed in robotic tool changers as a coupling mechanism. In one such configuration, a plurality of rolling members, such as steel balls, is contained in a collar of the master assembly, which is disposed within a chamber of a tool assembly. The balls are driven radially, such as by an advancing piston, and advance to bear against a bearing race in the tool assembly, mechanically coupling the master and tool assemblies together. To decouple, the piston is retracted, and the balls retreat into the collar as the master assembly separates from the tool assembly. Various configurations, driving mechanisms, and operational aspects of such ball-lock configurations are described in U.S. Pat. Nos. 8,005,570; 8,132,816; 8,209,840; 8,500,132; 8,533,930; 8,601,667; 8,794,418; 9,151,343; 9,724,830; and 10,335,957. All of these patents are assigned to the assignee of the present application, and the disclosures of all of them are incorporated herein by reference in their entireties.

Alignment is required between master and tool assemblies for proper mechanical coupling of the ball-lock mechanism to the tool assembly bearing race, and for the coupling of utility-passing modules attached to the master and tool assemblies. This alignment is typically accomplished by one or more alignment pins on the master assembly, which interface with corresponding alignment bushings in the tool assembly. In addition, these alignment pins and bushings also provide torsional rigidity to the coupled tool when the robot is in operation. To prevent binding, a small amount of diametral clearance is required between an alignment pin and its associated alignment bushing. This miniscule clearance is the primary source of rotational freeplay in the tool changer, which negatively affects positional repeatability and torsional stiffness. This effect is magnified in large end-of-arm tools, and can result in undesirable variation or position error at the point of work on each end effector. Freeplay also creates problems with electrical signal modules attached to tool changers, because the contact pins on the master and tool sides are allowed to move with respect to each other, possibly causing intermittent signal loss. It can also cause excessive wear from the shifting back and forth, which leads to premature failure.

To reduce torsional freeplay, it is known to machine spherical or cylindrical pockets—referred to herein as "scallops"—into the tool bearing race in the tool assembly, at the corresponding location of each rolling member. These features reduce freeplay, but do not eliminate it. One drawback of known designs is the scallop features must inherently have larger radii than their corresponding rolling members, to prevent binding. This diametral clearance provides a miniscule amount of freedom for the rolling members to rock back-and-forth within their respective scallops under reversing torsional loads. For the purpose of coupling, each rolling member is under 3-point contact, with one point of contact being the bottom of the bore in the master assembly collar, a second point of contact being the bottom of the scallop in the tool bearing race, and a third point being located on the tapered piston cam. These three points of contact are positioned on the same plane and approximately 120 degrees apart, although the point of contact on the piston or other mechanism advancing the rolling members does not carry significant torsional coupling load. This 3-point contact scheme, combined with even micro clearance, is enough to create deleterious torsional freeplay in the tool changer.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, scallop-like features in the form of cross-contact recesses are formed in at least one of, and preferably both of, the bearing race in the tool assembly at the points of contact of rolling members, and in the opposing inner surfaces of the bores in the master assembly. The cross-contact recesses are sized and shaped to receive a rolling member, but have a central void, or channel, perpendicular to the rolling member's motion in torsional freeplay, which does not contact the rolling member. The cross-contact recess contacts the rolling member at contact areas on either side of the central void. These contact areas impart two separate contact forces on the rolling member, both angled toward the center of the rolling member and hence operative to prevent side-to-side movement, or rocking, of the rolling member within the cross-contact recess, and hence substantially eliminating torsional freeplay of the robotic tool changer.

One embodiment relates to a robotic tool changer. The robotic tool changer includes a tool assembly including a bearing race. The robotic tool changer also includes a master assembly including a plurality of bores. Each bore is configured to contain a rolling member. The master assembly also includes a drive mechanism configured to force the rolling members against a surface of the bearing race to couple the master and tool assemblies, and to allow the rolling members to retract to decouple the master and tool assemblies. At least one of an inner surface of each bore and a plurality of positions on the bearing race include a cross-contact recess configured to seat a rolling member when the master and tool assemblies are coupled. Each cross-contact recess comprises a recess sized and shaped to receive a rolling member and a central void not contacting the rolling member. The cross-contact recess contacts the rolling member at two contact areas, one on either side of the central void.

Another embodiment relates to a method of coupling master and tool assemblies of a robotic tool changer. The master assembly is moved into abutment with the tool assembly. A plurality of rolling members disposed in bores in the master assembly is moved into contact with a bearing race in the tool assembly. Each rolling member is seated in a cross-contact recess formed in at least one of an inner surface of each bore and at a plurality of corresponding positions on the bearing race. Each cross-contact recess comprises a recess sized and shaped to receive a rolling member and a central void not contacting the rolling member, such that the cross-contact recess contacts the rolling member at two contact areas, one on either side of the central void.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
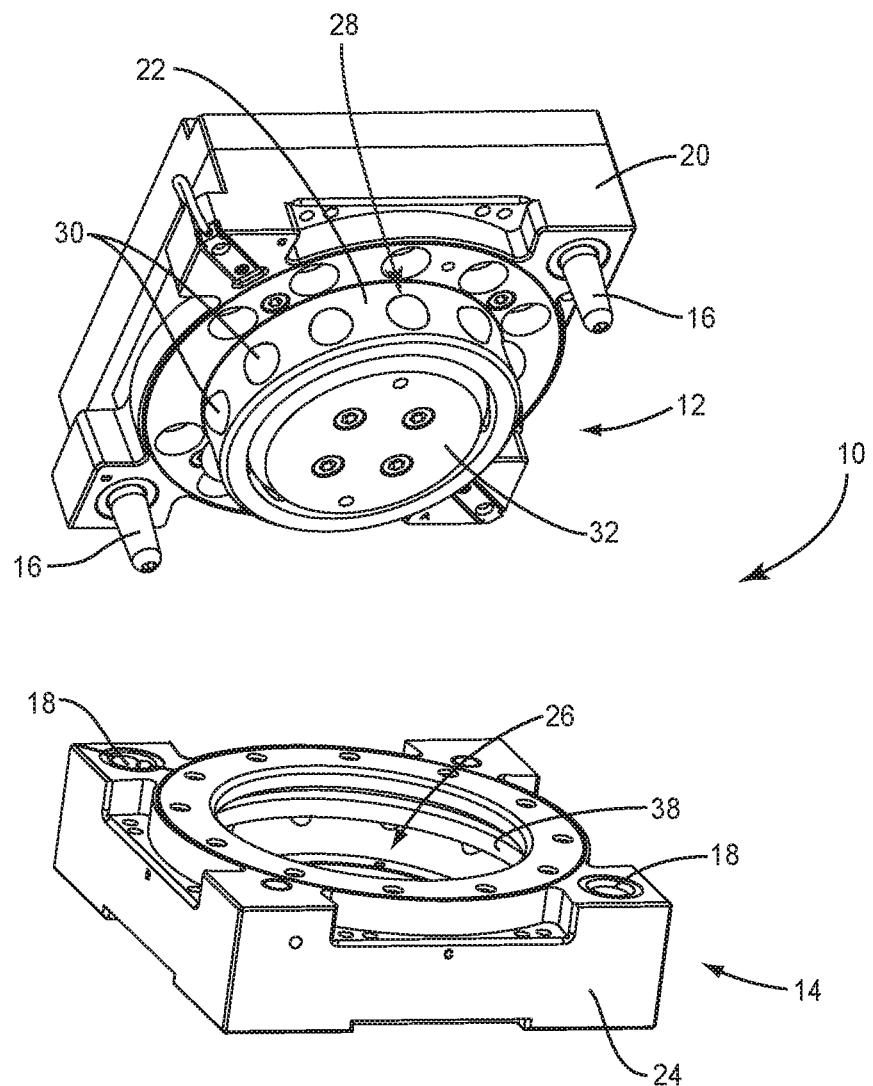
FIG. 1 is a perspective view of a robotic tool changer.

FIG. 1 depicts a representative robotic tool changer 10 employing a ball-lock coupling mechanism. One half of the robotic tool changer 10, called the master assembly 12, is permanently affixed to a robot arm (not shown). The other half, called the tool assembly 14, is affixed to each tool (not shown) that the robot may utilize. In any particular application, these mountings may be reversed. Accordingly, as used herein the terms "master" and "tool" are terms of reference only. Alignment pins 16 on the master assembly 12 mate with alignment bushings 18 on the tool assembly 14, to ensure proper alignment of the master and tool assemblies 12, 14 when the assemblies are coupled together.

The master tool assembly 12 includes a housing 20 and an annular collar 22 protruding therefrom and extending beyond the plane of the face of the housing 20. The tool assembly 14 includes a housing 24, with a circular chamber 26 formed therein. As depicted in the sectional view of FIG. 2, when the master and tool assemblies 12, 14 move toward abutment, in preparation to couple together, the collar 22 is disposed within the chamber 26.

A plurality of bores 28 is formed in the collar 22 and extend therethrough, the bores 28 having generally even radial spacing around the circumference of the collar 22. The bores 28 may be tapered, having a slightly larger diameter at the inner surface of the collar 22 than at the outer surface of the collar 22. Disposed in each bore 28 is a rolling member 30, such as for example a spherical ball. The rolling members 30 are retained within the collar 22 by each tapered bore 28 having a diameter at the exterior surface of the collar 22 that is slightly less than the diameter of the corresponding rolling member 30. Accordingly, the rolling members 30 may move between a retracted position wherein the outermost surface of each rolling member 30 is flush with or interior to the outer surface of the collar 22, and an extended position wherein each rolling member 30 extends past the outer surface of the collar 22 by an amount slightly less than the radius of the rolling member 30.

In this embodiment a cam 32 affixed to the end of a pneumatic piston is disposed within the interior space defined by the collar 22. The cam 32 has at least one tapered surface 34 which contacts the rolling members 30. The tapered surface 34 is angled such that it displaces the rolling members radially outwardly through the bores 28 as the cam 32 advances toward the tool assembly 14 to couple with it. To decouple, as the cam 32 retracts into the master assembly 12, it creates space allowing the rolling members 30 to retract within the collar 28. In various embodiments, the tapered surface 34 may comprise a multi-faceted surface, with fail-safe features that act to maintain a coupled state in the event of loss of power advancing the cam 32. These features are described in the above-incorporated U.S. Pat. No. 8,005,570. In other embodiments, the rolling members 30 may be advanced and retracted by a mechanism other a cam 32 attached to a pneumatic piston, as described in the above-incorporated U.S. Pat. Nos. 8,132,816 and 8,209,840.

Figure 2:
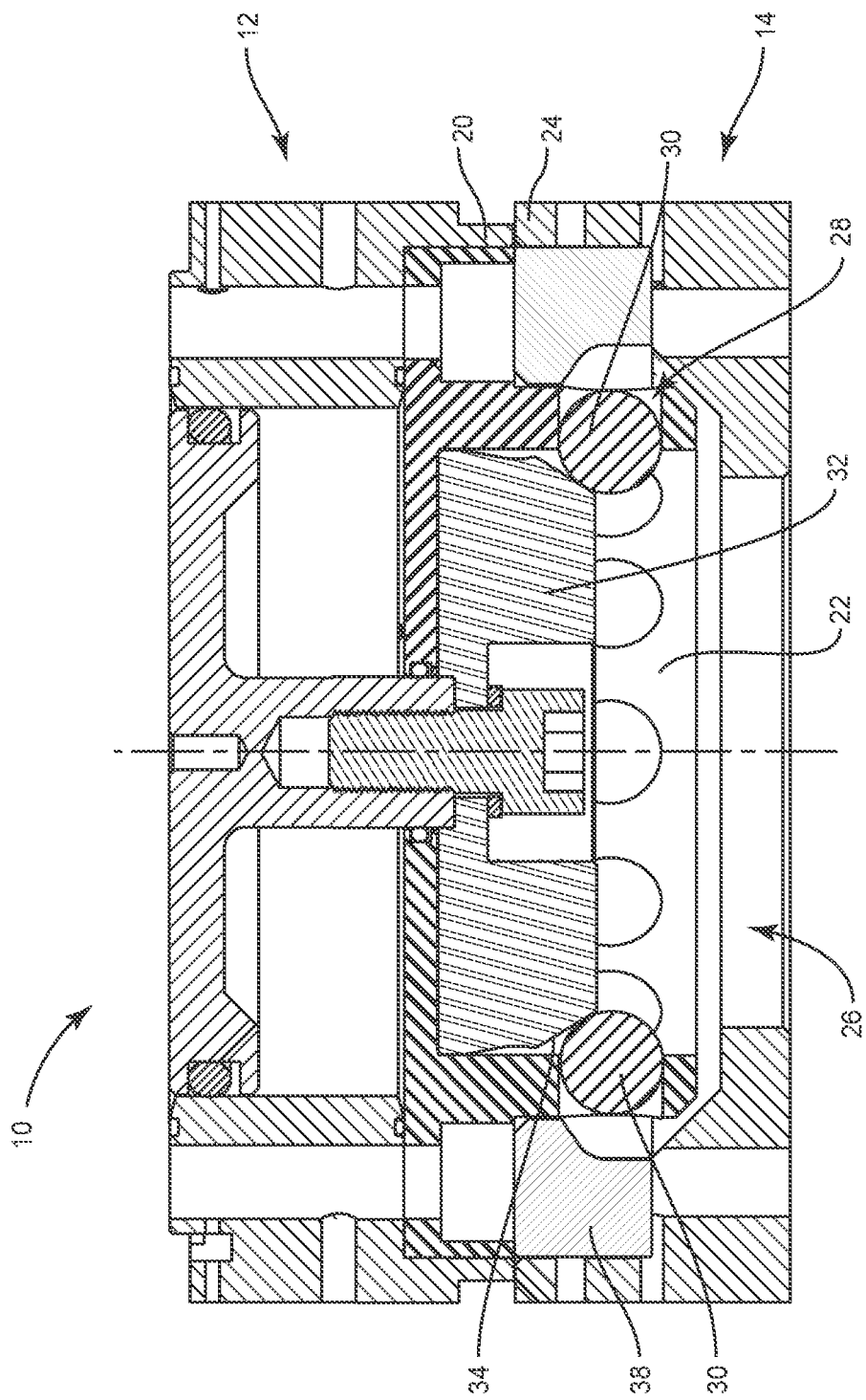
FIG. 2 is a section view of the robotic tool changer in a mated position but decoupled state.

FIG. 2 is a sectional view of relevant parts of a conventional robotic tool changer 10 as the master assembly 12 abuts, or mates to, the tool assembly 14, but has not yet actuated the ball-lock coupling mechanism—that is, the robotic tool changer 10 is in a decoupled state. The rolling members 30 are still retained within bores 28, as the cam 32 is in the fully retracted position. As the cam 32 advances toward the tool assembly 14 under the control of a robotic controller, the tapered surface 34 of the cam 32 will advance the rolling members 30 radially outward, and into contact with a bearing race 38 in the tool assembly 14, to couple the master 12 and tool 14 assemblies together.

Figure 3:
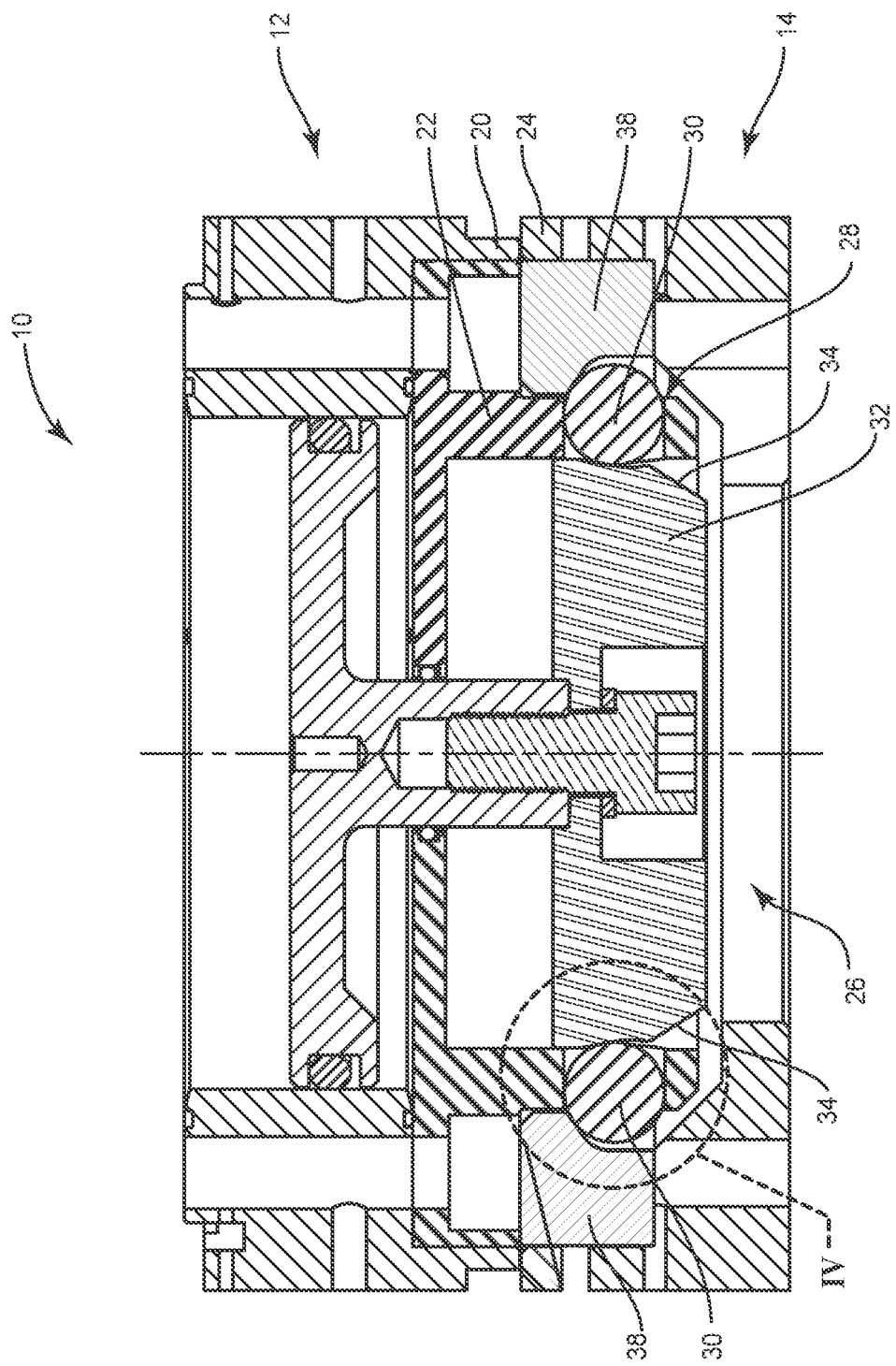
FIG. 3 is a section view of the robotic tool changer in a coupled state.

FIG. 3 is sectional view of relevant parts of the tool changer 10 as the master assembly 12 is fully coupled to the tool assembly 14. The cam 32 is fully advanced, pushing the rolling members 30 partially out of the bores 28 and into contact with the bearing race 38 in the tool assembly 14.

Figure 4:
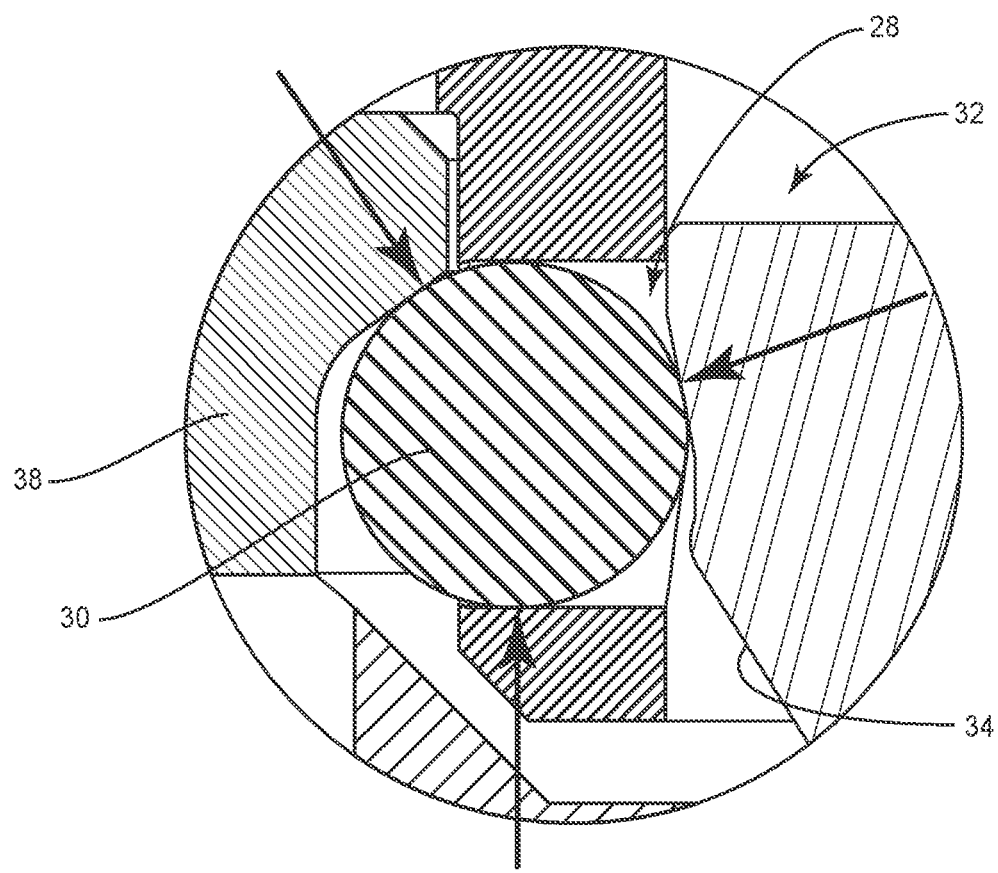
FIG. 4 is an enlarged section view of one rolling member of the robotic tool changer in a coupled state.

FIG. 4 is an enlarged view of part of FIG. 3, depicting one rolling member 30 when the master 12 and tool 14 assemblies are coupled, with force vectors indicating the forces on the rolling member 30. The primary forces are from the bearing race 38, the opposing inner surface of the bore 28, and the tapered surface of the cam 32. The cam 32 imparts a force urging the rolling member 30 outwardly and into contact with the bearing race 38; however this force does not directly arise from the coupling (e.g., the weight of the tool or a force or torque applied to the robotic tool coupler 10 by the tool in its use). As discussed above, even if scallops are formed in the bearing surfaces at the points of contact of these forces, because of the 3-point coupling contact, and the fact that the scallops necessary have a slightly greater diameter than that of the rolling member 30 to prevent binding, the coupling suffers from torsional freeplay, which has a deleterious effect on performance.

Figure 5:
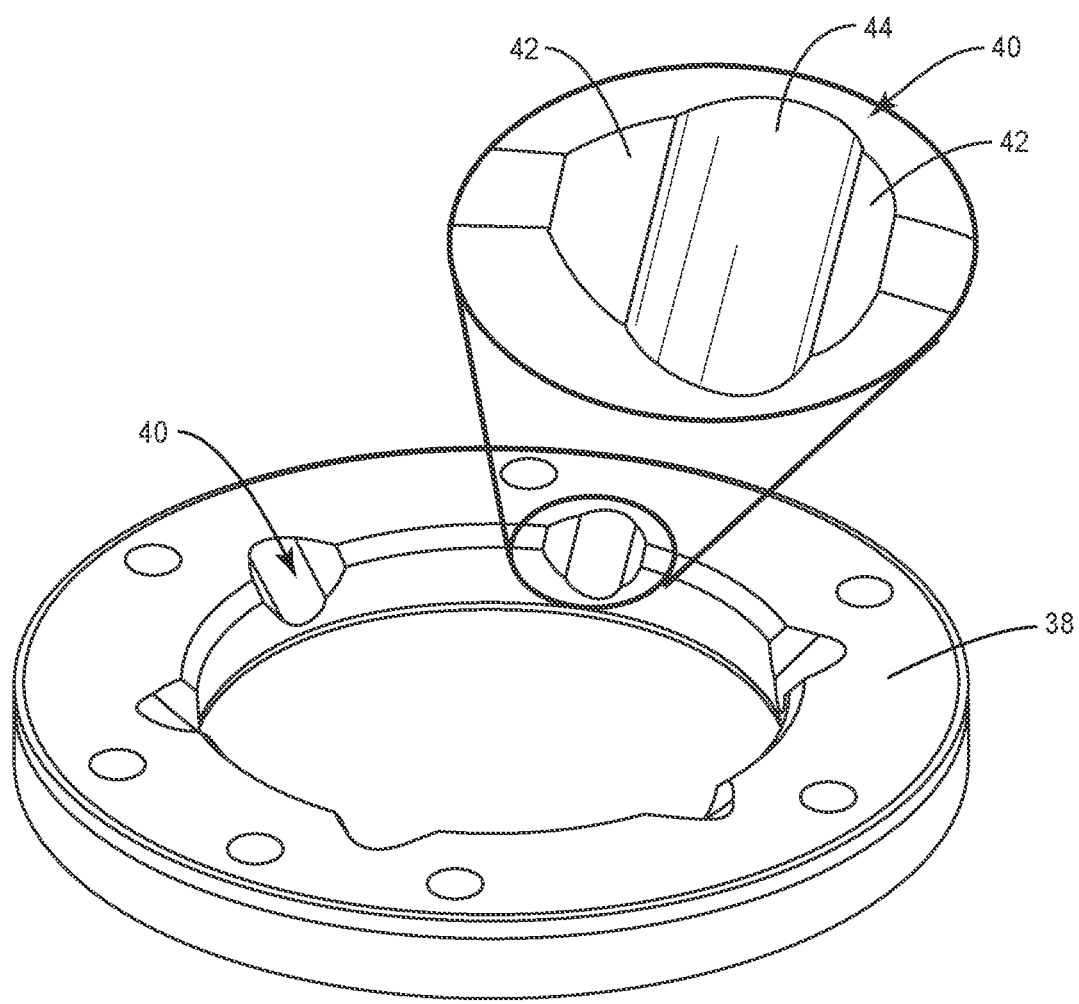
FIG. 5 is a perspective view of a bearing race, and an enlarged perspective view of a cross-contact recess formed in a coupling surface of the bearing race.

According to embodiments of the present invention, and as depicted in FIG. 5, scallop-like features in the form of cross-contact recesses 40 are formed in the bearing race 38 at the points of contact of rolling members 30. Cross-contact recesses 40 are also formed in the opposing inner surfaces of the bores 28, as discussed below with respect to FIG. 6. Each cross-contact recess 40 comprises a recess sized and shaped to receive a rolling member 30, and a central void 44, or channel, which does not contact the rolling member 30. Because of the central void 44, the cross-contact recess 40 contacts the rolling member at contact areas 42—one on either side of the central void 44. As explained further herein, these contact areas 42 impart two separate forces on the rolling member 30, both angled toward the center of the rolling member 30 and hence operative to prevent side-to-side movement, or rocking, of the rolling member 30 within the cross-contact recess 40. This substantially eliminates torsional freeplay of the robotic tool changer 10. At a minimum, a cross-contact recess 40 is formed either in an inner surface of a bore 28 in the master assembly 12 for each rolling member 30, or at a corresponding position on the bearing race 38 in the tool assembly 14. Preferably, cross-contact recesses 40 are formed in both the bores 28 and on the bearing race 38, such that each rolling member seats into two cross-contact recesses 40 when the robotic tool changer 10 assumes the coupled position.

As depicted in FIG. 5, the contact areas 42 are portions of a concave cylindrical surface sized and shaped to receive the rolling member 30, and the central void 44 is a vertical channel. However, in other embodiments, the contact areas 42 may be portions of a concave cylindrical surface sized and shaped to receive the rolling member 30. Furthermore, in other embodiments, the central void 44 may comprise a secondary recess or bore, with a circular or similar shape, and the contact areas 42 would comprise a "ring" of arcuate surface extending around the central void 44, and contacting the rolling member 30 on opposite sides thereof all the way around its periphery.

Because the central void 44 does not contact the rolling member 30, there is no risk of binding; hence, the two contact areas 42 need not necessarily include a diametral clearance over the diameter of the rolling member 30 (although in any given embodiment, such clearance may be desirable to account for machining tolerances). This alone helps reduce freeplay, as the cross-contact recesses 40 can more precisely hold the rolling members 30 in position. Freeplay is primarily eliminated, however, by the disparate forces induced on each rolling member 30 by opposing cross-contact recesses 40 in the bore 28 and the bearing race 38.

Figure 6:
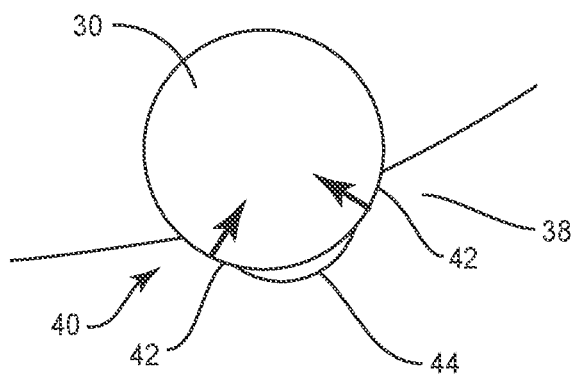
FIG. 6 is a section view of a rolling member seated in a cross-contact recess of a bearing race.

FIG. 6 depicts a section view of a rolling member 30 seated in a cross-contact recess 40 formed in the bearing race 38. Because the central void 44 does not contact the rolling member 30, two separate contact forces act on the rolling member 30. As indicated by the force vectors in FIG. 6, both of these forces are normal to the rolling member 30 surface, and are directed toward the center of the rolling member 30. Accordingly, each partially urges the rolling member 30 in a different direction—i.e., to the right as well as to the left. These opposing forces substantially eliminate the ability of the rolling member 30 to "rock" or move back-and-forth within the cross-contact recess 40, greatly enhancing torsional rigidity and substantially eliminating torsional freeplay.

Figure 7:
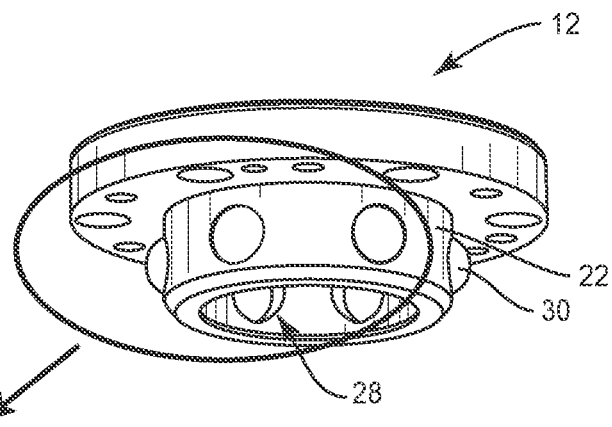
FIG. 7 is a perspective view a rolling member in a bore of a collar, with a section view showing the rolling member seated in a cross-contact recesses.
Figure 7:
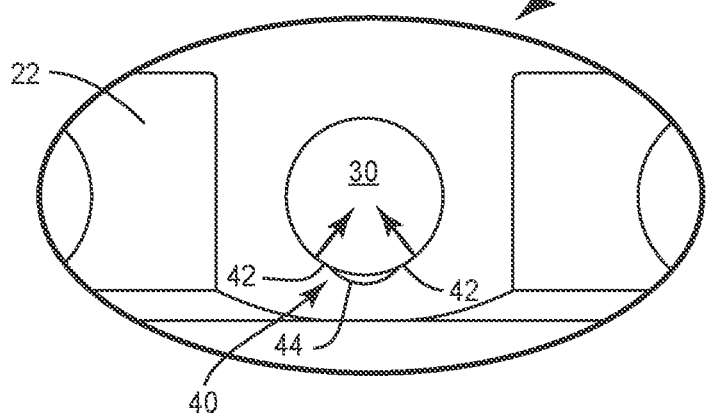

FIG. 7 shows the collar 22 of the master unit 12, with the bores 22, each containing a rolling member 30. An enlarged, partial section view shows the cross-contact recesses 40 formed in the bores 22. When the master and tool units 12, 14 are coupled together, and the rolling members 30 advanced partially out of the bores 22 and into contact with the bearing race 38, the rolling members are seated in the cross-contact recesses 40. As depicted in FIG. 6, the cross-contact recess 40 is a convex cylindrical recess (extending perpendicular to the plane of the paper), with a central void 44 formed therein as a groove or channel. Each rolling member contacts the cross-contact recesses 40 at contact areas 42 to either side of the central void 44. As indicated by force vectors, each contact area 42 presses the rolling member 30, with the forces being directed toward the center of the rolling member 30. Hence, a component of each of these force vectors act in opposing directions, simultaneously urging the rolling member to the left and to the right, and hence locking it in place.

Figure 8:
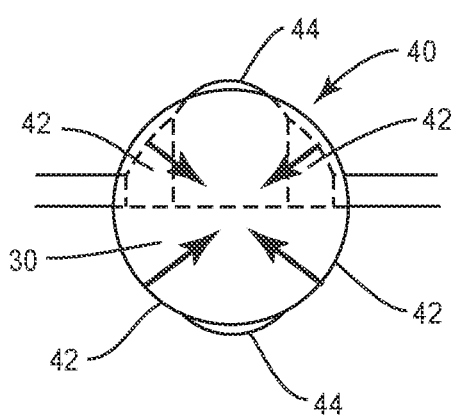
FIG. 8 is a section view of a rolling member seated in two cross-contact recesses, one in a master assembly bore and one in a bearing race.

FIG. 8 depicts the rolling member 30 when the tool changer 10 is in the fully coupled position. The rolling member 30 is simultaneously seated against two cross-contact recesses 40—one in the bore 28 in the master assembly 12 and the other in the bearing race 38 in the tool assembly 14. Each cross-contact recess 40 exerts the two forces discussed above on the rolling member 40, locking it even tighter against any motion. Note that there is actually a fifth force vector acting on the rolling member 30—that from the cam 32 urging the rolling member 30 against the bearing race 38.

Figure 9:
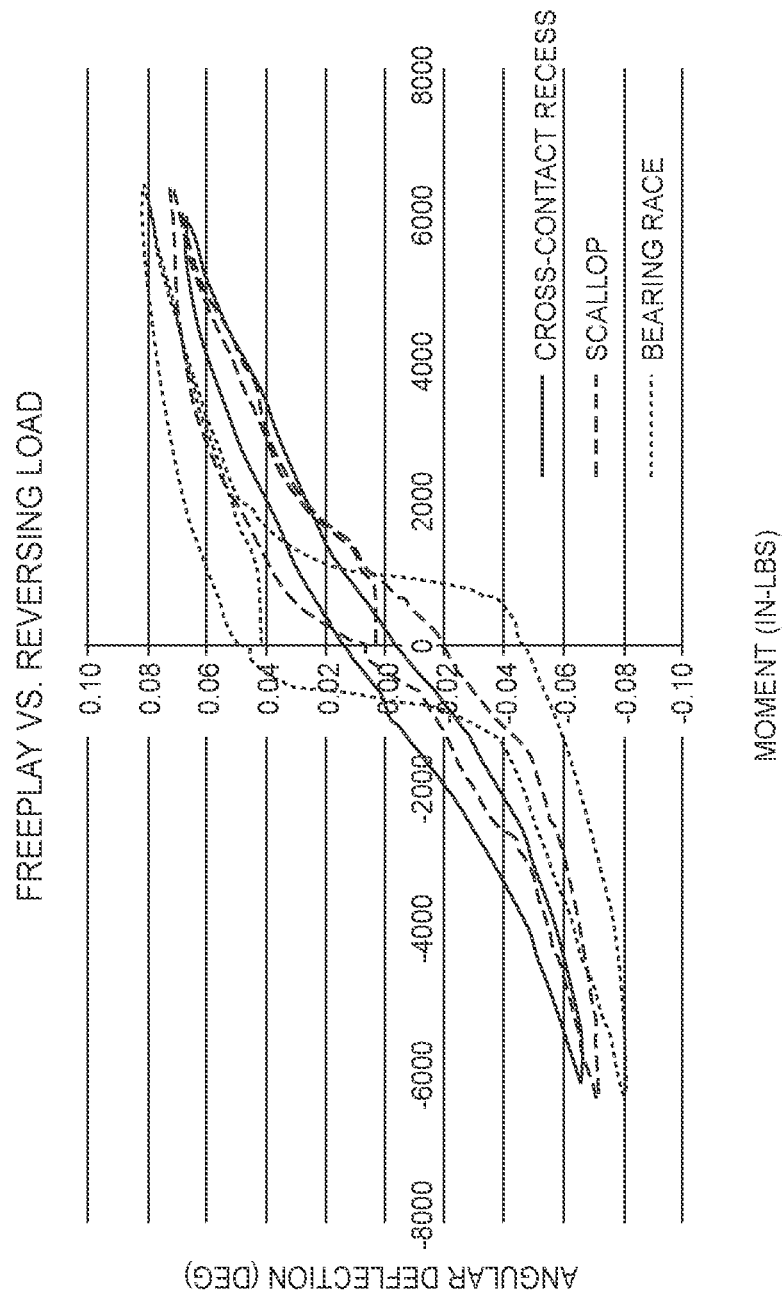
FIG. 9 is a graph of angular deflection vs. applied moment for three configurations of robotic tool changers.

FIG. 9 depicts the result of comparative testing of a robotic tool changer employing only a bearing race 38; one employing a bearing race 38 with conventional (prior art) scallops formed therein; and one employing cross-contact recesses 40 formed in both the bearing race 38 and within the bore 28. Reversing torsional loads were applied, and the deflection of the tool assembly 14 with respect to the master assembly 12 was measured. As FIG. 9 shows, the least total deflection, as well as the least rate of deflection that did occur, was achieved by the tool changer employing cross-contact recesses 40. Additionally, the curve plotting the data for the embodiment utilizing cross-contact recesses 40 is significantly more linear than the embodiments using any prior art technique. This results from lower backlash and freeplay across the spectrum of applied loads.

Figure 10A:
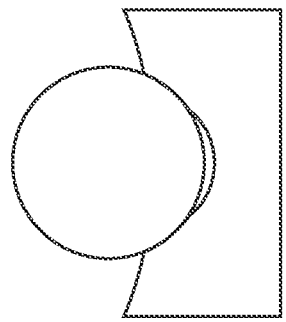
FIGS. 10A-10D are section views of a rolling member seated in various configurations of cross-contact recesses.
Figure 10B:
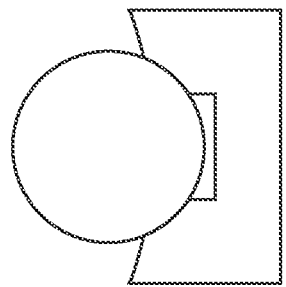

The cross-contact recess 40 depicted in FIGS. 5-8, and that used for the comparative testing described above, comprises a generally cylindrical concave recess, sized and shaped to receive a rolling member 30, with a central void 44 not contacting the rolling member. In this design, the cross-contact recess 40 contacts the rolling member 30 at two contact areas 42, one on either side of the central void 44. Each contact area 42 is hence a partial cylindrical concave surface having substantially the same radius as the rolling member 30. This design is shown in section view in FIG. 10A. However, embodiments of the present invention are not limited to this specific design. For example, FIG. 10B depicts substantially the same design, but where the central void 44 is a square channel, rather than an arcuate one. Those of skill in the art will readily recognize that the central void 44 may be of any cross-sectional shape, such as a U-shape, V-shape, or the like.

Figure 10C:
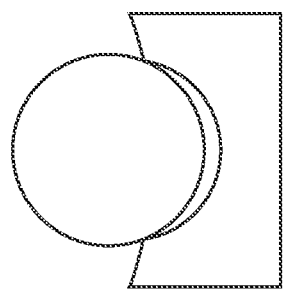
Figure 10D:
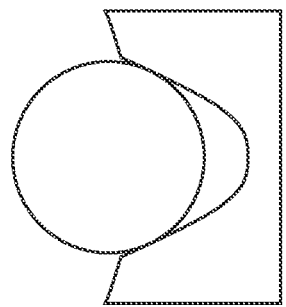

FIGS. 10C and 10D depict alternative embodiments, wherein the contact areas 42 of the cross-contact recess 40 are not partial cylindrical surfaces but rather points, or lines, of contact on the rolling member 30. For example, in the embodiment of FIG. 10C, the cross-contact recess 40 comprises a spherical or cylindrical concave recess, the radius of which is greater than the rolling member 30. In this embodiment, the central void 44 is not a distinct feature, but rather the main portion of the cross-contact recess 40, and the contact areas 42 to either side of the central void 44 comprise a line of contact extending around the rolling member (seen as contact points in the section view of FIG. 10C). This embodiment has the advantage of only a single fabrication step to form the cross-contact recess 40, without requiring the separate fabrication of a central void 44. Similarly, FIG. 10D depicts an embodiment in which the cross-contact recess 40 comprises a U-shaped or V-shaped channel (i.e., extending perpendicular to the plane of the paper), rather than a cylindrical or spherical concave recess. In this embodiment the contact areas 42 of the cross-contact recess 40 comprise points of contact on either side of the rolling member 30. Those of skill in the art will readily recognize that a variety of other shapes for a cross-contact recess 40, which achieve the advantage of contact areas 42 to either side of a central void 44 and hence freeplay-cancelling force vectors upon coupling, are possible within the broad scope of the present invention, given the teachings of the present disclosure.

Figure 11:
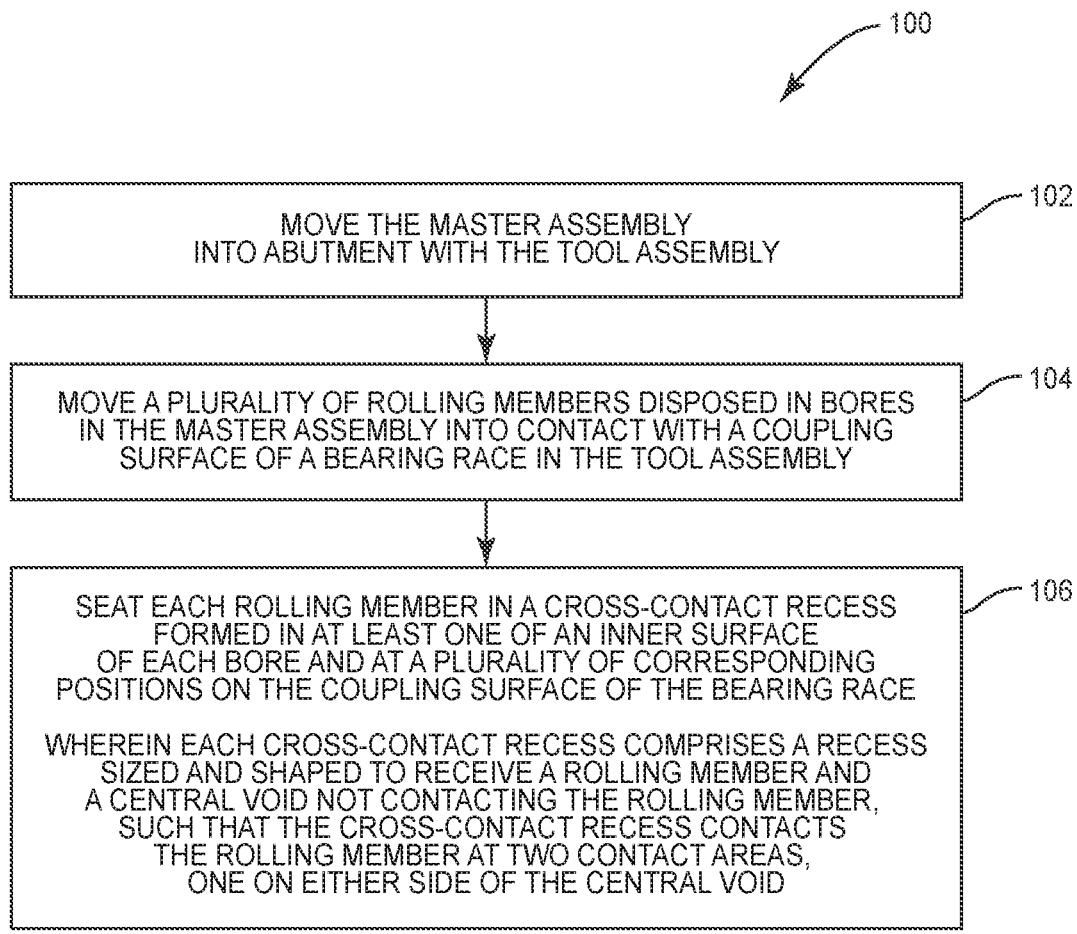
FIG. 11 is a flow diagram of a method of coupling master and tool assemblies of a robotic tool changer.

FIG. 11 depicts the steps in a method 100 of coupling the master 12 and tool 14 assemblies of a robotic tool changer 10. The tool assembly 14 includes a bearing race 38. The master assembly 12 includes a plurality of bores 28, each configured to contain a rolling member 30, and a drive mechanism 32 configured to force the rolling members 30 against the bearing race 38 to couple the master 12 and tool 14 assemblies, and to allow the rolling members 30 to retract to decouple the master 12 and tool 14 assemblies. At least one of an inner surface of each bore 28 and a plurality of positions on the bearing race 38 include a cross-contact recess 40 configured to seat a rolling member 30 when the master 12 and tool 14 assemblies are coupled. To couple the master 12 and tool 14 assemblies, the master assembly 12 is moved into abutment with the tool assembly 14—the position depicted in FIG. 2 (block 102). A plurality of rolling members 30 disposed in bores 28 in the master assembly 12 are moved into contact with the bearing race 38 in the tool assembly 14—the position depicted in FIG. 3 (block 104). Each rolling member 30 is seated in a cross-contact recess 40 formed in at least one of an inner surface of each bore 28 and at a plurality of corresponding positions on the bearing race 38, as depicted in FIGS. 6 and 7 (block 104). Each cross-contact recess 40 comprises a recess sized and shaped to receive a rolling member 30 and a central void 44 not contacting the rolling member, such that the cross-contact recess 40 contacts the rolling member 30 at two contact areas 42, one on either side of the central void 44, as depicted in FIG. 5.

Embodiments of the present invention present numerous advantages over the prior art. By seating each rolling member 30 in at least one, and preferably two, cross-contact recesses 40, at least one, and preferably two, pairs of contact forces are applied to the rolling member 30. Each force of the pair is spaced apart (by virtue of the contact areas 42 being separated by a central void 44), and are directed toward the center of the rolling member 30. Accordingly, a component of each force is in opposition, and kinematically restrains each rolling member 30 from side-to-side motion. Application of two pairs of forces increases this effect. As compared to prior art designs, in which enlarged scallops provide only one point of contact to each rolling member 30, the cross-contact recesses 40 virtually eliminate torsional freeplay in a robotic tool changer 10.

As used herein, the term "contact area" refers to the portion of a cross-contact recess 40 that contacts a rolling member 30 seated therein. The "area" may comprise a surface, line, or point. As used herein, the term "central void" refers to the portion of a cross-contact recess 40 between contact areas 42 that does not contact a rolling member 40 seated therein. The "void" may comprise a concave recess, a channel, a groove, or the like. As used herein, the term "configured to" means set up, organized, adapted, or arranged to operate in a particular way; the term is synonymous with "designed to." As used herein, the term "substantially" encompasses and accounts for mechanical tolerances, measurement error, random variation, and similar sources of imprecision.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic tool changer, comprising:
a tool assembly including a bearing race;
a plurality of spherical rolling members;
a master assembly including a plurality of bores, each configured to contain one of the plurality of spherical rolling members, and a cam having at least one tapered surface angled so as to urge the rolling members against the bearing race to couple the master and tool assemblies, and to allow the rolling members to retract away from the bearing race to decouple the master and tool assemblies;
wherein at least one of an inner surface of each of the plurality of bores and a corresponding plurality of positions on the bearing race include a cross-contact recess configured to seat a corresponding one of the rolling members when the master and tool assemblies are coupled;
wherein each of the cross-contact recesses of the plurality of bores or corresponding plurality of positions on the bearing race is generally cylindrical or spherical concave and has substantially a same radius as one of the plurality of spherical rolling members, and comprises a central void that does not contact the one of the plurality of spherical rolling members and two three-dimensional contact areas, each having a three-dimensional contact surface, one on either side of the central void, both of which contact the one of the plurality of spherical rolling members over respective corresponding three-dimensional contact areas of the one of the plurality of spherical rolling members when the master and tool assemblies are coupled, wherein each of the three-dimensional contact areas is greater than a point or line of contact.

2. The robotic tool changer of claim 1 wherein the central void is a concave channel.

3. The robotic tool changer of claim 1 wherein the central void is a rectangular channel.

4. The robotic tool changer of claim 1, wherein both of the inner surface of each bore and the corresponding plurality of positions on the bearing race include the cross-contact recesses of the plurality of bores or corresponding plurality of positions on the bearing race.

5. The robotic tool changer of claim 4, wherein when the master and tool assemblies are coupled, for each of the rolling members, the cross-contact recess in the inner surface of the corresponding bore and the cross-contact recess at the corresponding one of the plurality of positions on the bearing race together exert four forces on the rolling member, all directed toward a center of the rolling member.

6. A method of a coupling master assembly and tool assembly of a robotic tool changer, comprising:
moving a plurality of spherical rolling members disposed in bores in the master assembly into contact with a bearing race of the tool assembly when the master and tool assembly are abutted by advancing a cam having at least one tapered surface angled so as to urge the spherical rolling members against the bearing race to couple the master and tool assemblies; and
seating each of the plurality of spherical rolling members in a cross-contact recess formed in at least one of an inner surface of each of the bores and at a plurality of corresponding positions on the bearing race;
wherein each cross-contact recess of the bores or plurality of corresponding positions on the bearing race is generally cylindrical or spherical concave and has substantially a same radius as one of the plurality of spherical rolling members, and comprises a central void that does not contact the one of the plurality of spherical rolling members and two three-dimensional contact areas, each having a three-dimensional contact surface, one on either side of the central void, both of which contact the one of the plurality of spherical rolling members over respective corresponding three-dimensional contact areas of the one of the plurality of spherical rolling members when the master and tool assemblies are coupled, wherein each of the three-dimensional contact areas is greater than a point or line of contact; and
wherein retracting the cam allows the spherical rolling members to retract away from the bearing race to decouple the master and tool assemblies.

7. The method of claim 6 wherein the central void is a concave channel.

8. The method of claim 6 wherein the central void is a rectangular channel.

9. The method of claim 6, wherein seating each of the plurality of rolling members comprises seating each of the plurality of rolling members in the cross-contact recess of the bores or plurality of corresponding positions on the bearing race formed both in the inner surface of the corresponding bore and at one of the plurality of corresponding positions on the coupling surface of the bearing race.

10. The method of claim 9, wherein when the master and tool assemblies are coupled, for each of the plurality of rolling members, the cross-contact recess of the bores or plurality of corresponding positions on the bearing race in the inner surface of the corresponding bore and the cross-contact recess of the bores or plurality of corresponding positions on the bearing race at the corresponding one of the plurality of positions on the bearing race together exert four forces on the rolling member, all directed toward a center of the rolling member.

* * * * *